(No Model.)
C. BERST.
CHURN DASHER.
No. 398,488. Patented Feb. 26, 1889.
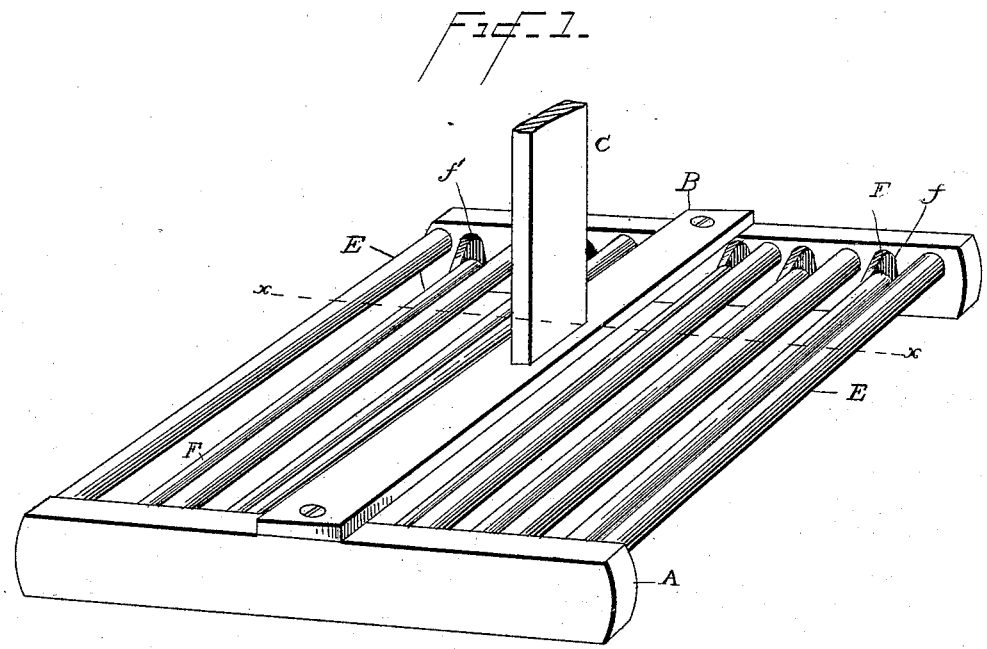
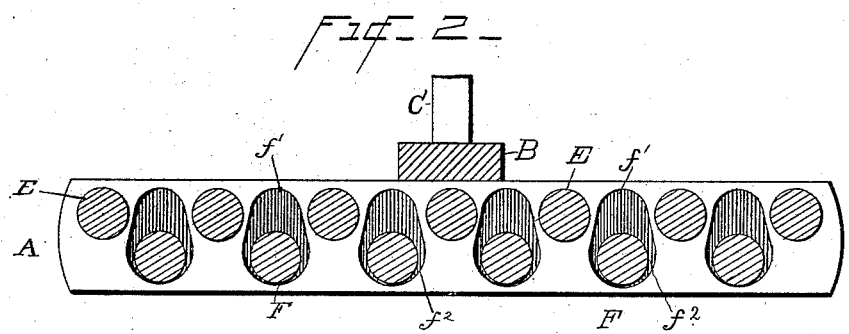
WITNESSES.
Norris A. Clark.
Arthur A. Erb
INVENTOR
Conrad Berst,
H. S. Snow & Co
By his Atty's

UNITED STATES PATENT OFFICE.

CONRAD BERST, OF KANSAS CITY, MISSOURI.

CHURN-DASHER.

SPECIFICATION forming part of Letters Patent No. 398,488, dated February 26, 1889.

Application filed October 23, 1888. Serial No. 288,975. (No model.)

*To all whom it may concern:*

Be it known that I, CONRAD BERST, a citizen of the United States, residing at Kansas City, in the county of Jackson and State of Missouri, have invented certain new and useful Improvements in Churn-Dashers; and I do hereby declare the following to be a full, clear, and exact description of the invention, such as will enable others skilled in the art to which it appertains to make and use the same.

This invention relates to dashers for agitating fluids and whipping or beating thin batters, and has for its object to provide a device of the nature hereinbefore stated which will have some of its beaters loosely mounted in the frame to facilitate the operation of the device and increase its efficiency.

The dasher is especially designed for churning, as it produces a thorough agitation of the cream and liberates the globules of butter in a comparatively short space of time.

The improvement consists of a frame and fixed and vertically-movable beaters, the latter having a slight lateral movement also to produce a counter-current, which materially assists the process of churning.

The improvement further consists in the peculiar construction and the combination of the parts, which will be hereinafter more fully described and claimed, and which is shown in the annexed drawings, in which—

Figure 1 is a perspective view of the dasher, the upper portion of the dasher-rod being broken away; and Fig. 2, a cross-section on the line $x\ x$ of Fig. 1.

The dasher-frame is composed of the two side bars, A A, and the cross-bar B, which unites the side bars and receives the lower end of the dasher-rod C, which is secured therein. The fixed beaters E, which may be of any desired number, are parallel with one another, and are supported at their ends in the said side bars, A A. The movable beaters F, arranged alternately with the fixed beaters E, are fitted at their ends to the said side bars, A A, in such a manner that they are free to have a limited vertical and lateral movement, preferably by having their ends fitted in recesses $f$ in the opposing sides of the said bars, said recesses being contracted at their upper ends, $f'$, to hold the beaters F steady when the dasher is descending, and being widened at their lower ends, $f^2$, to permit the said beaters F to have a limited lateral motion when the dasher is rising or when it is moved horizontally.

The operation of the devices is manifest from the foregoing description and the accompanying drawings.

What I claim, and desire to secure by Letters Patent, is—

1. In a dasher, the combination, with the frame and the fixed beaters arranged at intervals along the frame, of the vertically-movable beaters arranged between the fixed beaters, substantially as hereinbefore described.

2. In a dasher, the combination, with the frame and the fixed beaters arranged at intervals along the frame, of the vertically and laterally movable beaters placed between the fixed beaters to create a counter-current, substantially as and for the purpose described.

3. The combination, with the side bars of the frame having recesses $f$ in their opposing sides, which recesses are widened at their lower ends, and the beater-bars F, having their ends inserted in the said recesses and free to move vertically and laterally, of the fixed beater-bars arranged between the movable beater-bars and connecting the said side bars together, substantially as and for the purpose described.

4. The herein shown and described dasher, composed of the side bars having recesses in their opposing sides, said recesses being contracted at their upper ends and widened at their lower ends, the cross-bar uniting the said side bars, the dasher-rod fitted to the said cross-bar, the movable beaters having their ends fitted in the said recesses, and the fixed beaters arranged between the movable beaters and supported in the said side bars, substantially as and for the purpose specified.

In testimony whereof I affix my signature in presence of two witnesses.

CONRAD BERST.

Witnesses:
MULLER STEVENS,
T. H. NEWTON.